Figure 1:
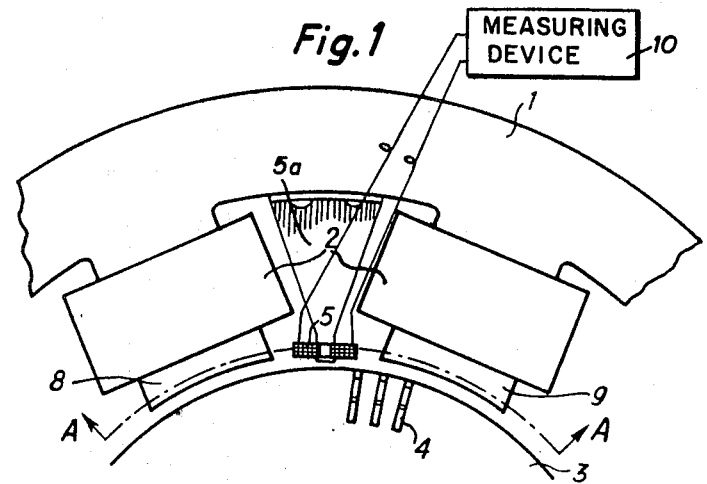

United States Patent

[11] 3,624,504

| | | |
|---|---|---|
| [72] | Inventor | Jacques Joly<br>Champagne-sur-Seine, France |
| [21] | Appl. No. | 785,871 |
| [22] | Filed | Dec. 23, 1968 |
| [45] | Patented | Nov. 30, 1971 |
| [73] | Assignee | Societe de Constructions<br>Electromecaniques Jeumont-Schneider<br>Paris, France |
| [32] | Priority | Dec. 29, 1967 |
| [33] | | France |
| [31] | | 134405 |

[54] METHOD OF AND APPARATUS FOR MEASURING THE DIRECT CURRENT SUPPLIED BY A RECTIFIER ARRANGEMENT FED BY AN ALTERNATOR
9 Claims, 2 Drawing Figs.

[52] U.S. Cl. ................................................. 324/158 MG,
310/68 R, 324/127
[51] Int. Cl. ............................................ G01r 29/00
[50] Field of Search ........................................ 324/47,
117, 158 MG, 43, 34, 127; 310/68, 68.2, 68.3, 68.4

[56] References Cited
UNITED STATES PATENTS

| 1,522,196 | 1/1925 | Macmillan .................... | 324/72 |
| 3,373,300 | 3/1968 | Sullivan ........................ | 310/68 |
| 3,412,271 | 11/1968 | Hall ............................. | 322/59 |

FOREIGN PATENTS

| 1,001,399 | 8/1965 | Great Britain ................ | 310/68.4 |
| 419,317 | 2/1967 | Switzerland .................. | 310/68 |

Primary Examiner—Rudolph V. Rolinec
Assistant Examiner—R. J. Corcoran
Attorney—Raymond A. Robic ABSTRACT: The disclosure relates to a method of measuring the direct current supplied by a rectifier arrangement fed by an alternator including the steps of detecting the harmonic fluxes created by the armature reaction field, and measuring the detected output, which output is directly proportional to the direct current supplied by the rectifier arrangement of the alternator. The apparatus for detecting the harmonic fluxes is a reference coil which is positioned adjacent to the armature of the alternator.

PATENTED NOV 30 1971 3,624,504

INVENTOR
Jacques JOLY
BY
Raymond A. Belair

ATTORNEY

METHOD OF AND APPARATUS FOR MEASURING THE DIRECT CURRENT SUPPLIED BY A RECTIFIER ARRANGEMENT FED BY AN ALTERNATOR

The present invention relates to a method of and an apparatus for measuring the direct current supplied by a rectifier arrangement fed by an alternator.

For alternators and turboalternators, the conventional commutator exciter is sometimes difficult to produce for reasons of dimensioning and commutation. It is then preferred to employ an excitation system formed, for example, of a semiconductor rectifier arrangement fed by an auxiliary rotary armature alternator directly driven from the end of the shaft of the alternator or of the turboalternator. This excitation system, which is known as a rotary rectifier system, has the advantage that it may be constructed without sliding contacts, i.e. rings and brushes, but this becomes a disadvantage when it is desired to measure the excitation current directly, owing to the absence of rings and brushes between the various circuits in the excitation system. Various means have been proposed, but they are complex and costly, and sometimes lacking in precision and reliability.

It is an object of the present invention to obviate these disadvantages by indirectly measuring the direct current supplied by a rectifier arrangement fed by an alternator, and more particularly the direct current supplied by a rotary rectifier excitation system, by a very simple means.

According to one aspect of the present invention there is provided a method of measuring the direct current supplied by a rotary rectifier arrangement fixed on the shaft of an alternator having a rotary armature feeding the rotary rectifier arrangement including the steps of detecting the harmonic fluxes created by the armature reaction field, and measuring the output which is directly proportional to the direct current supplied by the rectified arrangement of the alternator.

According to another aspect of the present invention there is provided apparatus for measuring the direct current supplied by a rotary rectifier arrangement fixed on the shaft of an alternator having a rotary armature feeding the rotary rectifier arrangement including means for detecting the harmonic fluxes created by the armature reaction field of the alternator, and means for measuring the output of the detecting means which is directly proportional to the direct current supplied by the rectifier arrangement of the alternator.

The above method of measuring direct current is based upon the following theoretical and experimental observations:

a. The alternator which feeds the rectifier arrangement supplies a nonsinusoidal current precisely because of these rectifiers. This current may be resolved into a fundamental component and harmonic components.

b. If this alternator-rectifier arrangement assembly feeds a circuit whose resistance is constant (for example when it is used to excite the field winding of a synchronous machine), it can be demonstrated that the proportion of each of the harmonic components, in relation to the fundamental component of the current supplied by the alternator, is constant regardless of the direct current supplied by the rectifier arrangement.

c. The influence of the voltage drop between no-load operation and operation under rated conditions is low. In other words, the absolute value of each harmonic component of the alternating current supplied by the alternator increases in proportion with the rectified current supplied by the rectifier arrangement.

d. Since the armature reaction field of the alternator can be resolved into a fundamental field and harmonic fields, it can be demonstrated that this fundamental field is fixed in magnitude and in direction in relation to the field of the alternator, while the harmonic fields rotate in relation to the same field.

The fluxes created by the harmonic armature reaction fields may be detected by a reference coil appropriately fixed to the field. There corresponds to each harmonic an induced electromotive force which then gives an exact image of the rectified current which is supplied. By the choice of a harmonic whose proportion is preponderant, and, where appropriate, by the use of a tuned circuit, filters and amplifiers, high precision is obtained in the measurement of the electromotive force induced in the reference coil. This constitutes a very simple means of measuring the direct current supplied. The present invention will now be described in greater detail by way of example with reference to the accompanying drawing, in which:

FIG. 1 is a diagrammatic view of a portion of an alternator; and

Figure 2:
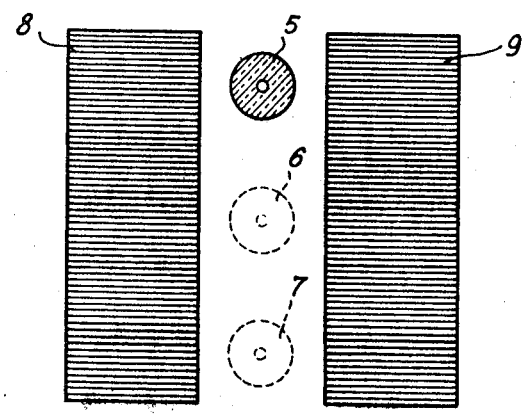

FIG. 2 is a developed view of a cylindrical section along the line A—A of FIG. 1. In FIG. 1, there is shown a portion of the yoke 1 of the field system of a synchronous three-phase alternator having a rotating armature 3, of which only two consecutive poles 8 and 9 and their field windings 2 are shown. Only a few slots 4 are shown in the armature 3 for the sake of clarity.

A reference coil 5 is mechanically fixed to the yoke 1 by an appropriate device, such as bracket 5a. The reference coil 5 is arranged in the space situated between the two poles 8 and 9 at such a short distance from the armature (for example of the same order of magnitude as the width of the airgap) as to be able to pick up the fluxes created by the harmonic armature reaction fields.

In order to give a more precise idea of the position of the reference coil 5 along the armature, there has been indicated in FIG. 2 one of its possible positions at 5 between the poles 8 and 9. However, it may equally well be positioned at 6 or at 7 or at any point around the armature. The reference coil may even be positioned level with the overhangs of the armature.

Moreover, a number of similar coils may be employed, these coils being, for example, coupled in series or in parallel. Generally speaking, however a single reference coil is sufficient and its form is immaterial provided that it can pick up the fluxes created by the harmonic armature reaction fields. The number of turns of the coil 5 is chosen with due regard to the flux through the coil.

It is well known that the armature reaction field does not contain even harmonics because of the axial symmetry of the armature. Therefore, only odd harmonics such as the third, the fifth, the seventh...etc. will be produced. It is found that these harmonics both give rise to fields rotating at six times the synchronous speed in relation to the inductor.

This is because, in relation to the armature, the fifth harmonic rotates at five times the synchronous speed in the same direction the rotation of the armature, and the seventh harmonic rotates at seven times the synchronous speed but in a reverse direction to the rotation of the armature; whereas in relation to the reference coil, the fifth harmonic fluxes are rotating at 5+1=6 times the synchronous speed and the seventh harmonic fluxes are rotating at 7−1=6 times the synchronous speed. Therefore, the corresponding fluxes are added together in the reference coil, so that it is possible to obtain high precision in the measurement of the electromotive forces induced in this coil.

The coil 5 is connected to a measuring device 10 including a voltmeter and, if desired filters in order to eliminate the other harmonics, or a circuit tuned to the frequency of the flux corresponding to the fifth and seventh harmonics, or any other appropriate amplification device.

In the example referred to, the preponderant harmonics have been chosen, but the subject of the present invention is not limited to this choice. The type of rectifier employed is also immaterial. However, if thyristors are employed, the signal collected at the reference coil or coils should be corrected as a function of the firing delay angle of the thyristors.

The invention is applicable not only to the case of a synchronous alternator, but also to the case of an asynchronous alternator. Finally, it is not limited in its applications to the case of a rotary rectifier arrangement, it being possible for this arrangement to be stationary.

I claim:

1. A method of measuring the direct current supplied by a rotary rectifier arrangement fixed on the shaft of an alternator having a rotary armature feeding said rotary rectifier arrangement, comprising the steps of detecting, with a coreless coil, the harmonic fluxes created by the armature reaction field of the alternator, which harmonic fluxes rotate with respect to said coil as opposed to the fundamental flux which is stationary with respect thereto, and generating a signal proportional to said harmonic fluxes, and measuring said signal which signal is an indication of the direct current supplied by the rectifier arrangement.

2. An apparatus for measuring the direct current supplied by a rotary rectifier arrangement fixed on the shaft of an alternator having a yoke sustaining a number of stator poles and a rotary armature feeding the rotary rectifier arrangement, including at least one coreless coil secured to said yoke between two consecutive stator poles, said coil being positioned relative to said armature so as to detect the harmonic fluxes created by the armature reaction field of said alternator which fluxes rotate with respect to the stator and said coil as opposed to the fundamental flux which is stationary relative thereto, said coil generating an output signal proportional to said harmonic fluxes, and means for measuring the output of said coil, said output being directly proportional to the direct current supplied by the rectifier arrangement.

3. An apparatus as defined in claim 2, wherein said coil is spaced from the armature by a distance which is approximately equal to the width of the airgap between the poses and the armature.

4. An apparatus as defined in claim 2, wherein a plurality of coils is provided between the poles, said coils being electrically connected in series.

5. An apparatus as defined in claim 2, wherein a plurality of coils is provided between the poles, said coils being connected in parallel.

6. An apparatus as defined in claim 2, wherein the means for measuring the output of the coils includes a voltmeter.

7. An apparatus as defined in claim 2, wherein the means for measuring the output of said coils includes filter means for eliminating unwanted harmonics.

8. An apparatus as defined in claim 2, wherein the means for measuring the output of said coils includes a circuit tuned to a predetermined harmonic.

9. A method as defined in claim 1, wherein the harmonics detected are the fifth and seventh harmonics.

* * * * *